US005527994A

United States Patent [19]

Kasper

[11] Patent Number: 5,527,994

[45] Date of Patent: Jun. 18, 1996

[54] WATER COOLED KICKLESS CABLE AND METHOD

[76] Inventor: James J. Kasper, 5332 Pin Oak Cir., Sheffield Village, Ohio 44054

[21] Appl. No.: 251,838

[22] Filed: May 31, 1994

[51] Int. Cl.[6] .......... H02G 15/02

[52] U.S. Cl. .......... 174/74 R; 29/860; 29/868

[58] Field of Search .......... 174/74 R, 15.7, 174/19, 75 R; 29/860, 868

[56] References Cited

U.S. PATENT DOCUMENTS

| | | | |
|---|---|---|---|
| 3,127,467 | 3/1964 | Toto | 174/15.7 |
| 3,333,044 | 7/1967 | Toto | 174/15.7 |
| 3,601,520 | 8/1971 | Carasso | 174/15.7 |
| 4,199,653 | 4/1980 | Talley | 174/15 |
| 4,640,982 | 2/1987 | Kasper et al. | 174/15.7 |
| 5,317,804 | 6/1994 | Kasper | 29/860 |

*Primary Examiner*—Morris H. Nimmo
*Attorney, Agent, or Firm*—Renner, Otto, Boisselle & Sklar

[57] ABSTRACT

A kickless water cooled cable includes six alternate polarity conductor strands and paired terminal lugs at each end which are semi-circular and mutually insulated along a diameter, the inner end of each lug including a projection having parallel flattened strand connecting surfaces. The projections are offset from each other along the diameter of insulation, the opposite offset surfaces providing a radially outer and a recessed inner connecting surface on the respective lugs. A single strand is connected to the outer surface while a dual strand termination is connected to the recessed inner surface, the single strand lying between the dual strand to form the alternate polarity conductor strands. The strands are separated by a star separator and enclosed in a hose through which water is circulated. The projections include angled inner ends to provide greater contact area, the dual strand termination includes an angled offset portion parallel to yet clearing the angled surface of the opposite lug. To improve the electrical connections and its useful life at least the dual strand connection surface has an abutment shoulder along its outer edge running the length thereof. The dual strand fitting connection is also provided with two axially spaced fasteners, a knurled surface and a solder connection. The star separator includes a stiffener with graduating degrees of stiffness to reduce stress on the connections. All of the above improvements enhance the electrical connections and lengthen the service life of the cable.

27 Claims, 2 Drawing Sheets

WATER COOLED KICKLESS CABLE AND METHOD

DISCLOSURE

This invention relates generally as indicated to a water cooled kickless cable and method of making such cable, and more particularly to a cable which is simple of construction yet which provides a long useful life. The present invention relates to certain improvements in a cable as shown and described in prior U.S. Pat. No. 4,199,653 to Lawrence M. Talley.

BACKGROUND OF THE INVENTION

Alternate polarity kickless cables are well known in the art and are widely used to connect, for example, welding guns to transformers. Such cables have a number of stranded conductors or individual cables which alternate in polarity. The above Talley patent discloses six alternate polarity conductor strands. A star separator isolates the adjacent cables which are connected to high current capacity end terminals or lugs which are semi-circular and which are mutually electrically insulated along a diameter. Since every other conductor strand has to be connected to opposite halves, the cable termination presents a complex connection which also happens to be the usual point of wear or failure limiting the service life of the cable. While the design of the cables is to minimize the kicking or twisting which occurs during each welding cycle, some, nonetheless occurs. Also, a major application of such welding cables is in robotic welders. In such applications, the welding head may move into many different positions, again requiring the cable to flex or twist. It is therefore important that the overall cable be sufficiently flexible to permit the required movements, yet it is also important that stress concentrations at the terminations be minimized to the extent possible.

The cable and termination shown in prior U.S. Pat. No. 4,199,653 to Talley presents an efficient termination in that it avoids twisting individual conductors or strands to obtain the alternate polarity. In Talley, of the six conductors, two sets of two conductors or strands are provided with each set of two including end fittings. There are also two individual conductors each mounted in a fitting, or six strands all together. The fittings and mounting surfaces on the two termination halves are arranged such that a single conductor fitting mounted on one half nests that single conductor slightly radially outwardly and between the two conductors of a two conductor fitting mounted on the opposite half. In this manner, the conductors do not have to twist or weave around each other and the cable is easier to construct as well as to repair. The strand terminal fittings are readily mounted on the appropriate platforms on the respective termination half lugs using fasteners.

While the cable of the Talley patent has many advantages, one drawback is the use of single fasteners, particularly on the strand termination fitting for the dual strand set. This fitting carries twice the current of a single strand fitting and it has been found that over the life of the cable, particularly in robotic applications, the single fastener in the dual strand fitting may tend to loosen. If it does, the single fastener then may become a pivot point for unwanted relative movement. Although the cable can quickly be repaired, the unscheduled down time, however short, in a production line using robotics machinery is something to be avoided or at least minimized. One way to minimize such down time is to increase the service life of the cable.

Accordingly it would be highly desirable to have a water cooled kickless cable of the type shown in the prior Talley patent but which would have a superior service life while at the same time provide improved efficiency.

SUMMARY OF THE INVENTION

With the present invention a kickless water cooled cable includes an even number of alternate polarity conductor strands and paired terminal lugs at each end which are semi-circular and mutually insulated along a diameter, the inner end of each lug including a projection having parallel flattened strand connecting surfaces. The projections on the respective lugs are offset from each other along the diameter of insulation, the opposite offset surfaces providing a radially outer and a recessed inner connecting surface on the respective lugs. A single strand fitting is connected to the outer surface of each while a dual strand termination fitting is connected to the recessed inner surface of each, the single strand lying between the dual strand to form the alternate polarity conductor strands. The strands are separated by a star separator and enclosed in a hose through which water is circulated. The projections include angled outer ends to provide greater contact area with the dual strand termination fitting including an angled offset portion parallel to yet clearing the angled surface of the opposite lug. To improve the electrical connections and the useful life, the projection surfaces are shouldered with at least the dual strand connection surface having an abutment shoulder along its outer edge running the length thereof. The dual strand fitting connection is also provided with two axially spaced fasteners, a knurled surface interface, and a solder connection. The star separator includes a stiffener with multiple gradations of stiffness to reduce stress on the connections. All of the above improvements enhance the electrical connections and the service life of the cable.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
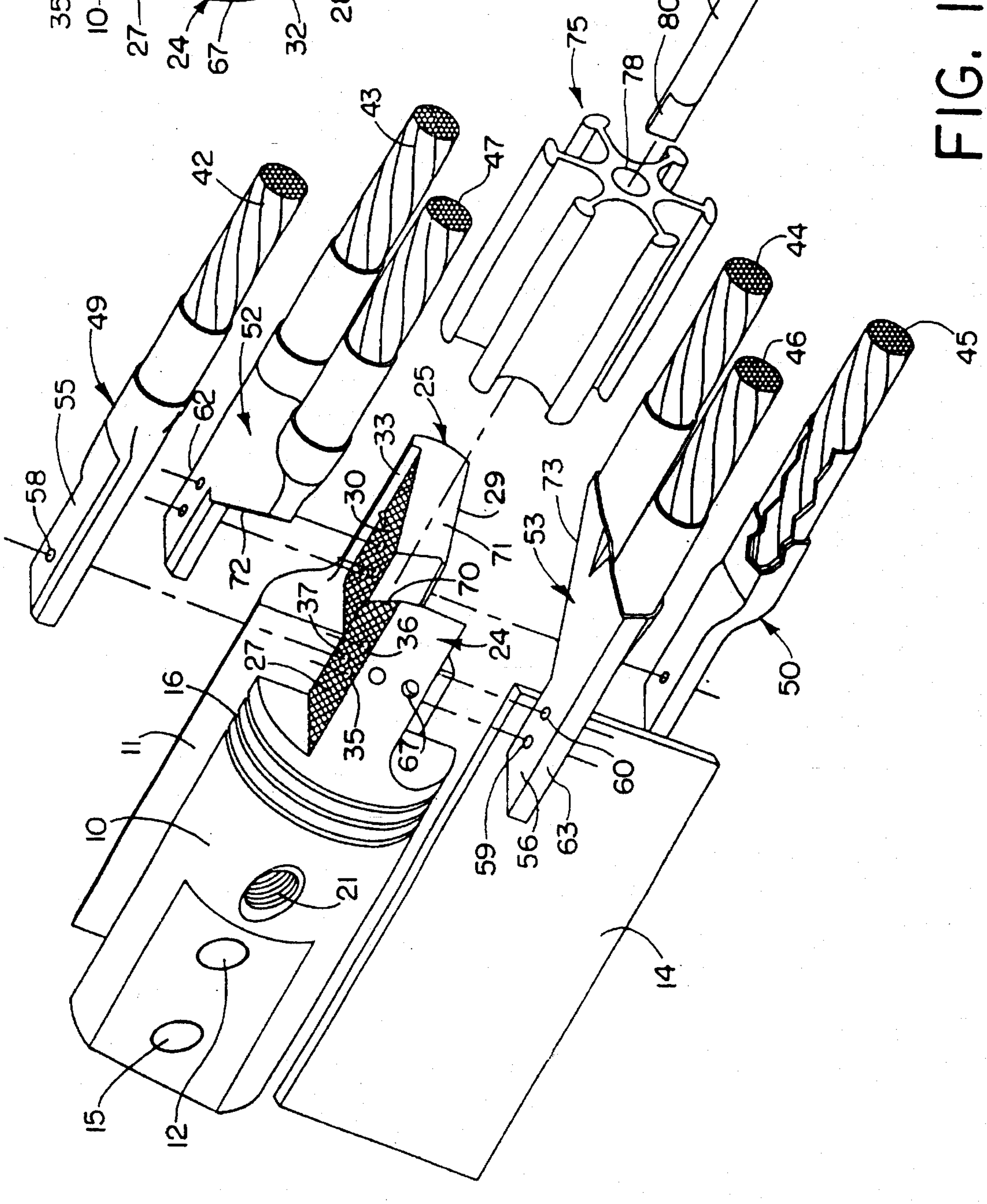
FIG. 1 is an exploded perspective view of one termination of a cable in accordance with the present invention.

Referring initially to FIG. 1, there is illustrated in exploded form one termination of a kickless water cooled alternate polarity welding cable in accordance with the present invention. It will be appreciated that the cable may be of substantial length and that the opposite end of the cable will have an identical termination as the one illustrated.

Figure 4:
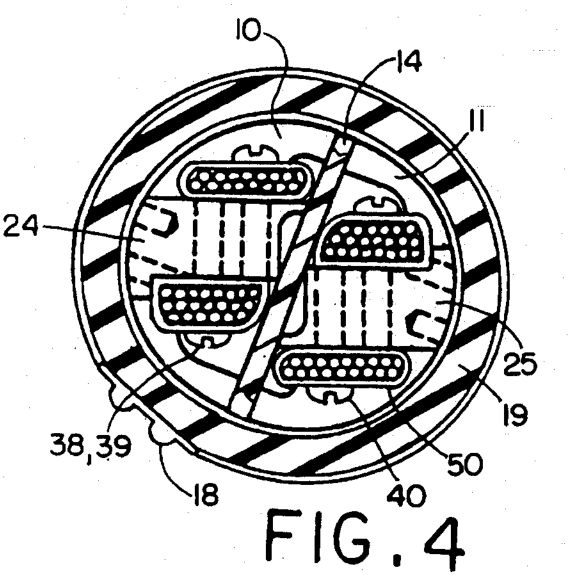
FIG. 4 is a view similar to FIG. 3 but illustrating the hose surrounding the termination.
Figure 7:
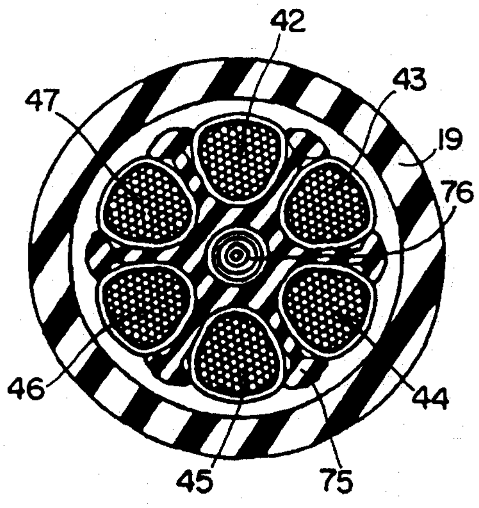
FIG. 7 is a transverse section through the cable illustrating the configuration of the star separator and the stiffener within the star separator at each end of the cable.

Each termination comprises a pair of half round semi-cylindrical copper blocks shown at 10 and 11 which are assembled together by an insulated fastener assembly through the hole 12. A layer of electrical insulation material 14 is positioned between the half round termination lugs. The flat or outer end of the lugs also may include a fastening hole 15 by which the cable is connected to a transformer or welding head, for example. The exterior of the blocks is also provided with a series of annular grooves indicated at 16 which cooperate with a band or hose clamp 18 to seal each end of a hose 19 which completely encases the cable from termination to termination. The band clamp and hose are seen more clearly in FIGS. 4 and 7. Water is circulated through the hose by the use of suitable fittings threaded into the passages 21 or 22 in each of the half round termination lugs. Such passages are seen more clearly in FIG. 6.

The inner end of each half round termination lug is provided with an inwardly extending projection as seen at 24 and 25 for the lugs 10 and 11, respectively. As seen also in FIG. 2, projection 24 includes parallel mounting surfaces 27 and 28 while the projection 25 includes such surfaces 29 and 30.

Because the projections 24 and 25 are offset from each other along the diameter of the insulation, the surface 27 is less recessed than the surface 28. Similarly, the surface 29 is less recessed than the surface 30. The more recessed surfaces 28 and 30 are provided with an axially extending linear abutment shoulder near the outer edge as seen at 32 and 33, respectively. The abutment shoulders extend parallel to the axis of the cable and relatively near the circumference of the circle formed by the connected terminal lugs.

Each projection is provided with three transverse through holes seen at 35, 36 and 37. The outer holes 35 and 36 are axially spaced and yet axially aligned. The holes 35 and 36 receive fasteners 38 and 39 while the hole 37 receives a single fastener 40. The fasteners are seen, for example, in FIGS. 3, 4 and 6.

Figure 2:
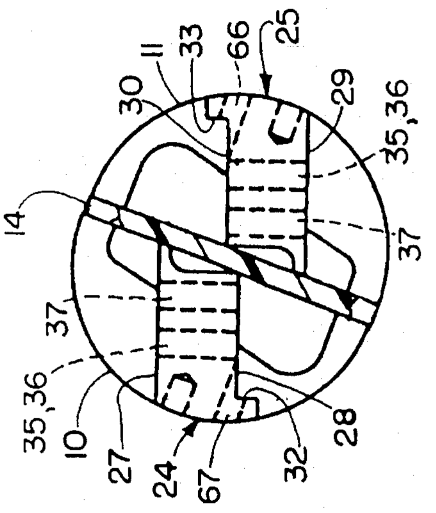
FIG. 2 is a transverse view partially in section of the assembled termination lugs with the insulation therebetween illustrating the offset of the projections and mounting surfaces along the diameter.

In the cable illustrated, six individual conductors or strands are employed which are connected to the terminal illustrated and also to the opposite terminal. The six stranded individual conductors are illustrated at 42, 43, 44, 45, 46 and 47, and are preferably stranded copper rope formed of small ⅛ hard copper wires. The numbers are assigned to the individual conductor strands in a clockwise order as viewed in FIG. 7. It will be seen that the conductor strands 42 and 45 are individual strands each having their own swaged termination fittings illustrated at 49 and 50, respectively. The conductor strands 43 and 47 form a set of two and each end of the set is formed with an L-shape fitting as seen at 52. Similarly the conductor strands 44 and 46 form a set of two and each end is formed with its L-shape termination fitting seen at 53. Each fitting is swaged or formed into a tine as indicated at 55 for the single strand fittings 49 and 50, or at 56 for the double strand fittings 52 and 53. The tines are provided with appropriate drilled holes to accommodate the fasteners, two for the dual strand fittings, and a single fastener for the single strand fitting. The holes in the tines 55 are illustrated at 58 while the two holes in the tines 56 are seen at 59 and 60. In the embodiment of FIG. 2, care is taken that the outer edges of the dual strand fittings 52 and 53 indicated at 62 and 63, respectively, are linear and parallel to the axis of the cable. It is the edges 62 and 63 which abut against the shoulders 33 and 32 seen in FIG. 2.

After the terminal block lugs are assembled as seen in FIG. 2, the cables or strands are connected. Initially the dual strand fitting 52 will be secured to the more recessed surface 30 on the right hand side of FIG. 2 using two fasteners extending through the holes 59 and 60 of the tine of such fitting and entering the two holes 35 and 36 on the right hand side of the projection 25 as seen in FIG. 2. Such fasteners may be self tapping screws. Care is taken to ensure that the edge 62 abuts squarely against the shoulder 33.

In addition, the surface 30 may be flood soldered as the fasteners are tightened and any access solder will exit or fill the weep hole seen at 66 in FIG. 2. With the conductor strands 43 and 47 in place, the single conductor 42 is attached to the surface 27 using a fastener through the hole 58 and the single hole 37. The conductor strand 42 will nest between the conductor strands 43 and 47.

Next the dual strand fitting 53 is fastened to the underside or recessed surface 28 using two fasteners, one through each of the two holes 35 and 36, and finally the single strand 45 is fastened to the bottom surface 29 nesting between the strands 44 and 46. Again a flood solder connection may be provided for the dual strand connection with solder filling weep hole 67. Accordingly, each of the surfaces 27, 30, 29 and 28 is strategically arranged both radially and with respect to each other so that the strands nest properly together without any interweaving or twisting.

Figure 6:
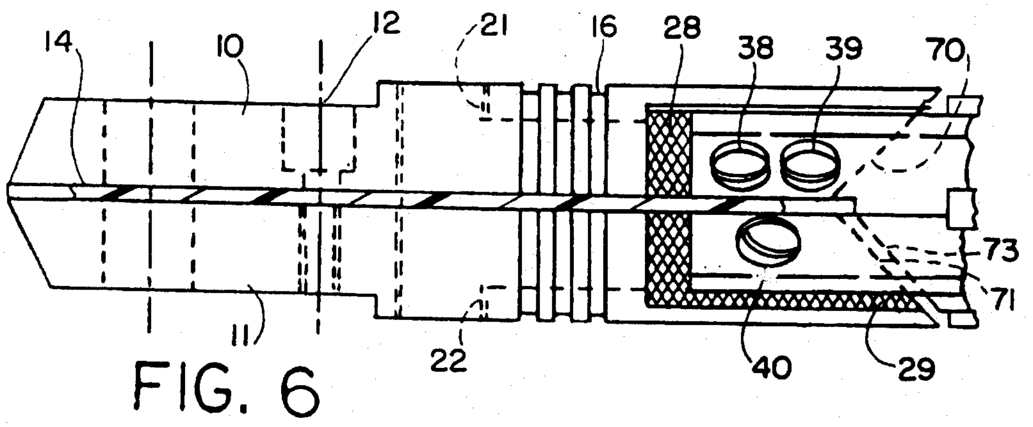
FIG. 6 is a fragmentary side elevation of the termination illustrating the assembled terminal lugs and the strand termination fittings and also illustrating how the dual strand fitting is spaced from yet parallel to the angled end of the opposite lug projection.

As seen in FIG. 1 and also in FIG. 6, each of such surfaces is knurled. Accordingly, as the fasteners are tightened, the knurling will bite into or slightly deform the contact surfaces on the fitting holding the fittings firmly in place when the fasteners are tightened.

It is also noted with more clear reference to FIG. 6 that the inner ends of the lug projections extend at an angle to the axis of the cable. This angle forms what might be termed a V-notch opening toward the interior of the cable. The inner surfaces of the lug projections forming such V-notch are seen at 70 and 71 in FIG. 1, but the relationship when assembled is seen more clearly in FIG. 6. The L-shape fittings 52 and 53 have a leading edge extending transversely from the tine seen at 72 and 73, respectively, which generally parallel the angled end faces of the opposite lug projections. There is, however, a significant clearance provided as seen by the relationship of the surfaces 71 and 73 in FIG. 6. It has been found that the angled end faces of the projections provide significantly more surface area contact between the conductor strand fittings and the lug projections.

Figure 3:
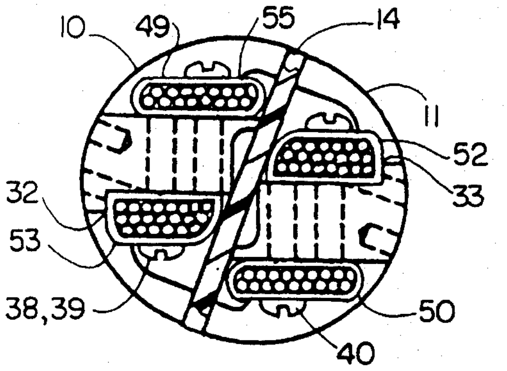
FIG. 3 is a view similar to FIG. 2 but illustrating the conductor strand fittings attached to the projection surfaces.

After the strand fittings are secured to the terminal block lugs as seen in FIG. 3, the cable strands and the one attached terminal are laid out on a table. A star separator seen at 75 is inserted to ensure separation of the strands, such separator including a graduated cable stiffener 76 at each end which may be inserted in the central hole 78 of the star separator.

After the strands are laid out on the table with the separator and stiffeners in place, the strands are helically twisted to provide a uniform twisting from one end to the other. The strands are then connected to the opposite terminal of the cable in exactly the same manner as described above. After both terminals are connected, the cable is inserted into a rubber hose 19 which is clamped at both ends for water or coolant circulation therethrough. The star separator is designed to enhance the flexibility of the cable and to avoid binding. The operation the star separator is described in more detail in the copending application of Langhenry et al., Ser. No. 08/201,351 filed Feb. 24, 1994 entitled Water Cooled Cable And Method Of Making.

The stiffener as illustrated in FIG. 1 has a flat outer end 80 which may project from the end of the star separator and be clamped between the termination lugs. The stiffener is round in section as illustrated at 81 and the diameter progressively reduces to the outermost (innermost with regard to the cable) section 82. The stiffener is in the form of a plastic tube or rod which has little lateral flexibility at the largest diameter section and has significant lateral flexibility at the smallest diameter section or tip 82. Because of the eight different diameters, seven of which are of equal axial length, the graduating degrees of lateral flexibility afforded by the stiffener is uniform from the least flexibility to the most over the length of the stiffener. Such stiffener minimizes stress concentrations at the fitting-lug connection.

Figure 5:
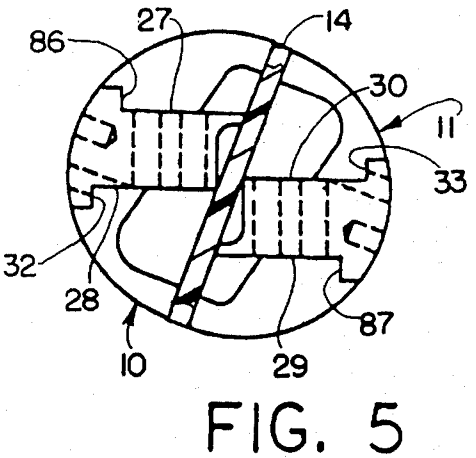
FIG. 5 is a view similar to FIG. 2 but illustrating a slightly modified form of the invention.

Although most problems have been encountered in connection with the dual strand fitting which carries twice the current of a single strand fitting, it will be appreciated that both surfaces of the projection may be provided with abutment shoulders to keep the fitting from moving with respect to the projection. In FIG. 5, there is illustrated an embodiment of the present invention which employs abutment shoulders on all four fastening surfaces. As seen in FIG. 5, in addition to the abutment shoulders 32 and 33 on the surfaces 28 and 30, the surfaces 27 and 29 are provided with abutment shoulders 86 and 87, respectively. With the embodiment of FIG. 5, care is taken to form the tine of the single strand fitting straight and parallel to the axis of the cables so that it will fit snugly and squarely against the shoulder and be locked in place when secured by the fastener. In the embodiment of FIG. 5, the projections end on look like a lopsided T.

It can now be seen that there is provided a cable termination assembly having all of the advantages of the prior Talley construction, yet having significantly longer service life with little additional cost. With the improvements of the present invention, the cable becomes more suitable for use in high production robotic welders, for example.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. A multi-stranded cable including a terminal comprising a pair of semi-circular terminal lugs mutually insulated along a diameter, each lug having a recessed flattened projection on its inner end, the respective projections being offset from each other along the diameter of insulation, a dual strand terminal fitting connected to the more inwardly offset surface of each projection, and at least two fasteners spaced along the length of the dual strand terminal fitting axially of the cable securing the dual strand terminal fitting to the more inwardly offset surface of each projection, and said inwardly offset surface of each projection being provided with an abutment shoulder against which said dual strand terminal fitting is fastened when secured to said inwardly offset surface.

2. A cable as set forth in claim 1 wherein at least said inwardly offset surface of each projection is knurled.

3. A cable as set forth in claim 2 wherein said dual strand terminal fitting is generally L-shape with the long leg of L being fastened to the inwardly offset surface, and the short leg being swaged to embrace generally parallel yet spaced conductor strands.

4. A cable as set forth in claim 3 wherein the outer end of each projection extends at an angle to the axis of the cable, the short leg of the L-shape fittings also extending at an angle to the long leg to extend parallel to yet spaced from the outer end of the projection of the lug to which the dual strand terminal fitting is not attached.

5. A cable as set forth in claim 1 wherein said dual strand terminal fitting is soldered to said inwardly offset surface.

6. A cable as set forth in claim 5 including a star separator extending between each strand from the terminal lugs, and a stiffener adjacent the terminal lugs to make the cable stiffer near the terminal lugs.

7. A cable as set forth in claim 6 including stiffeners adjacent the lugs operative to reduce the tendency of the dual strand terminal fitting to move with respect to the lug projection to which it is attached.

8. A cable as set forth in claim 5 including a weep hole through the abutment adapted to receive excess solder as the dual strand filling is attached to the offset surface.

9. A cable having opposite terminals, each terminal comprising a pair of semicircular terminal lugs mutually insulated along a diameter, each lug having a flattened projection at its inner end, the respective projections being offset from each other along the diameter of insulation, with each projection providing recessed substantially parallel flat conductor connecting surfaces, each of said surfaces of each projection including an abutment shoulder extending the length thereof to abut the conductor when secured to said surfaces.

10. A cable as set forth in claim 9 wherein each projection in section has the appearance of a lopsided T.

11. A cable having terminals at each end, each terminal comprising a pair of mutually insulated terminal lugs each having a flattened projection at its inner end, each projection providing parallel flat and knurled conductor connecting surfaces, at least one surface of each projection including a conductor abutting shoulder to keep the conductor from moving when attached to said one surface, and at least two fasteners securing the conductor to the surface in abutment with the shoulder.

12. A cable as set forth in claim 11 including a solder connection between the conductor and surface, and an angled weep passage through the shoulder to receive excess solder as the conductor is fastened to the surface in abutment with the shoulder.

13. A cable having terminals at each end, each terminal comprising a pair of mutually insulated terminal lugs each having a flattened projection at its inner end, each projection providing parallel flat conductor connecting surfaces, at least one surface of each projection including a conductor abutting lateral shoulder extending axially of the cable terminal to keep the conductor from moving when attached to said one surface.

14. A cable as set forth in claim 13 including at least two fasteners securing the conductor to the surface in abutment with the shoulder.

15. A method of making a water cooled kickless cable comprising the steps of securing together a pair of semicircular terminal lugs mutually insulated along a diameter with each lug having a recessed flattened projection forming mounting surfaces on its inner end, with the respective projections being the offset from each other along the diameter of insulation, connecting single and dual strand conductor fittings to the surfaces of such projections, and for at least the dual strand fittings providing an abutment surface adapted to engage the fitting to assist in keeping the fitting from moving with respect to the projection to which it is attached during operation of the cable.

16. A method as set forth in claim 15 including the step of using at least two axially spaced fasteners to hold the dual strand fitting to the projection surface in engagement with the abutment surface.

17. A method as set forth in claim 16 including the step of soldering the dual strand fitting to the projection, and providing a weep hole through the abutment to receive excess solder.

18. A method as set forth in claim 17 including the step of knurling each mounting surface.

19. A method as set forth in claim 18 including the step of stiffening the cable adjacent the terminal lugs.

20. A method as set forth in claim 19 including the step of graduating the degree of stiffening for a short distance adjacent the terminal lugs.

21. A cable having opposite terminals, each terminal comprising a pair of semicircular terminal lugs mutually insulated along a diameter, each lug having a flattened projection at its inner end, the respective projections being offset from each other along the diameter of insulation, with each projection providing recessed substantially parallel flat conductor connecting surfaces, at least one of said surfaces of each projection including a shoulder extending the length thereof to abut the conductor when secured to said one of said surfaces, said shoulder extending parallel to the axis of the cable along the radial outer edge of the conductor connecting surface.

22. A cable as set forth in claim 21 including at least two fasteners spaced axially of the cable holding the conductor to the surface and in linear engagement with said shoulder.

23. A cable as set forth in claim 22 including dual strand conductors and single strand conductors, said dual strand conductors being connected to said one of said surfaces.

24. A cable as set forth in claim 23 wherein each surface of each projection is knurled.

25. A cable having opposite terminals, each terminal comprising a pair of semicircular terminal lugs mutually insulated along a diameter, each lug having a flattened projection at its inner end, the respective projections being offset from each other along the diameter of insulation, with each projection providing recessed substantially parallel flat conductor connecting surfaces, at least one of said surfaces of each projection including a lateral shoulder extending the length thereof axially of the cable to abut a lateral edge of the conductor when secured to said one of said surfaces.

26. A cable as set forth in claim 25 wherein each end of each projection terminates inwardly in a surface at an angle to the axis of the cable.

27. A cable as set forth in claim 26 including dual strand conductor fittings secured to opposite surfaces of opposite projections, each said fitting being shaped to clear yet parallel the angled inner surface of the opposite lug.

* * * * *